United States Patent Office 2,996,381
Patented Aug. 15, 1961

2,996,381
PHOTOGRAPHIC MATERIALS AND PROCEDURES FOR USING SAME
Gisela K. Oster and Gerald Oster, New York, N.Y., assignors to Kalvar Corporation, New Orleans, La., a corporation of Louisiana
No Drawing. Filed July 2, 1957, Ser. No. 669,455
16 Claims. (Cl. 96—49)

The present invention relates to novel products and procedures for preparing photographic images. More particularly, the invention is concerned with the polymerization of various vinyl monomers by means of light sensitive diazonium salts so that the thus created polymer forms a photographic image composed of light scattering polymeric elements.

It has been proposed to produce photographic images by the polymerization of vinyl monomers using certain light sensitive substances which initiate polymerization on being irradiated with light. Such light sensitive substances include organic peroxides, aliphatic azonitriles, and certain dye-reducing agent combinations. All these methods require fixation of the image by removal of the non-light struck photo-sensitive material with solvents which dissolve the monomer but not the polymer.

An object of the present invention is to produce a photographic image containing polymeric units but whose fixation requires only the application of heat, and, hence, is a dry pohtographic process. This, and still further objects, will become apparent from the following description.

As indicated, the invention contemplates the provision of new compositions suitable for use in preparing photographic images and processes involving the use of these compositions to form such images. Broadly speaking, the compositions of the invention comprise a film of polymerizable vinyl monomer having a photolytic or light sensitive diazonium compound dispersed therein. Preferably, the film comprises a support coated with the vinyl monomer. Suitable supports include cellulose acetate, colored or white paper, glass, synthetic linear polyamides such as nylon, polyethylene terephthalate (Mylar) and the like.

In accordance with the invention, it has been discovered that the polymerizable vinyl monomer or, if desired, monomer mixture, when exposed to light and subsequently heated can be polymerized to give a visible image. The exact mechanism of the invention is not fully understood. However, it is believed that polymerization of the vinyl monomer is casued by free radicals produced by heating the diazonim salt in the presence of the products of the light decomposed diazonium salt which are formed upon exposure. It therefore appears that the prduction of the visible image depends on the following principle: Light photolyzes the diazonium salt to yield products which on heating react with remaining diazonium salt to give free radicals and these free radicals initiate polymerization of the monomer to give polymer in the light struck areas.

The vinyl monomer may comprise any of the known photopolymerizable organic vinyl compounds, i.e. compounds containing a single $CH_2=C<$ group as the sole site of addition polymerization. Typically suitable monomers include acrylyl and alkacrylyl compounds, e.g. acrylic, haloacrylic and methacrylic acids, esters, nitriles and amides such as acrylonitrile, methyl methacrylate, ethyl methacrylate, butyl methacrylate, octyl methacrylate, cyclohexyl methacrylate, methoxymethyl methacrylate, chloroethyl methacrylate, methacrylic acid, ethyl acrylate, calcium acrylate, and alphachloroacrylic acid; vinyl and vinylidene halides such as vinyl chloride, vinyl fluoride, vinylidene chloride, vinylidene fluoride; vinyl carboxylates such as vinyl acetate, vinyl laurate, vinyl propionate, vinyl stearate; N-vinyl imides such as N-vinylphthalimide and N-vinyl succinimide; N-vinyl-lactams such as N-vinylcaprolactam; vinyl aryls such as styrene and other vinyl derivatives including vinyl pyrrolidone. Mixtures of any two or more of the above monomers may also be utilized.

According to the invention, the vinyl monomer should be used in a medium in which the monomer is soluble. The polymer produced therefrom should, however, be insoluble therein. This insolubility of the polymer in the medium produces the light scattering centers necessary to give the desired image while solubility of the monomer in the medium gives a clear background. The particular medium utilized can be varied considerably and will depend primarily upon the nature of the monomer and polymer involved. For example, if the starting monomer is acrylonitrile, there may be used an alcoholic solvent, e.g. the lower aliphatic alcohols such as ethanol, in which the monomer is soluble but the polymer is not. The solvent may contain thickening agents in sufficient concentration to render the photographic plate or film essentially dry to the touch. The thickening agent should be a colloid soluble in the solvent. Where water is used as the medium, suitable thickening agents may include gelatin, polyvinyl alcohol, dextrin, and the like. For an alcoholic medium, suitable thickening agents include alcohol-soluble nylon, polyvinylpyrrolidone and polyvinyl alcohol. In addition to water or alcoholic solvent, esters such as ethyl acetate, ketones such as ethyl ketone, or the like may be used as the medium in which the vinyl monomer is dissolved for the purposes of the invention. In fact, any solvent for the monomer but which is preferably not a solvent for the polymer may be utilized.

The diazonium salts which may be used in accordance with the invention comprise all known diazonium salts which are capable of being photolyzed by light. Preferably, for ease in handling, the diazonium compound is one which is unaffected by ordinary room light. As typically suitable diazonium compounds there may be mentioned the following: para-diazo dimethyl aniline zinc chloride, p-diazo diphenylamine sulfate, p-diazo diethylaniline zinc chloride, p-diazo ethyl hydroxyethylaniline zinc chloride, p-diazo ethyl methyl aniline zinc chloride, p-diazo diethyl methyl aniline zinc chloride, p-diazo ethyl hydroxyethylaniline zinc chloride, 1-diazo-2 oxy naphthalene-4 sulfonate, p-diethyl amino benzene diazonium chloride $ZnCl_2$, 4-benzoylamino-2-5-diethoxy benzene diazonium chloride, p-chlorobenzene-sulfonate of 4-diazo-1-cyclohexylaniline, p-chlorobenzene-sulfonate of 4-diazo-2-methoxy-1-cyclo-hexylamino benzene, tin chloride double salt of 4-N-methyl-cyclohexyl-amino-benzene diazonium chloride, p-acetamino benzene diazonium chloride, 4-dimethylamino benzene diazonium chloride, 3-methyl 4-diethyl amino benzene diazonium chloride, 4-morpholino benzene diazonium chloride, 4-piperidyl 2-5-diethoxy benzene diazonium chloride, 1-dimethyl amino naphthalene-4 diazonium chloride, 4-phenyl amino diazo benzene diazonium chloride. Other diazonium compounds are illustrated in the examples set forth hereinafter.

The amount of diazonium compound utilized can be varied over a wide range and will depend upon such other factors as the nature of the monomer and the type of image desired. Generally speaking, however, from 0.001% to 10% of the diazonium compound, based on the weight of monomer, should give effective results.

The type of light employed for exposure depends primarily upon the absorption spectrum of the diazonium compound which is used. In particular, the light utilized must include the wavelengths corresponding to the absorption spectrum of the diazonium salt. Thus, for example, p-diazodimethylaniline zinc chloride is essentially sensitive to radiation within the 300 to 420 millimicron range. Accordingly, ultra-violet light may be used for exposure purposes. Typically suitable light sources may include high pressure mercury lamps, tungsten lamps preferably 500 watts or greater, xenon-filled discharge lamps, zirconium arcs, carbon arcs, and other light sources rich in near ultraviolet and/or blue visible light.

As indicated heretofore, a unique characteristic of the present process is that it is a dry one, i.e. development of the image and fixation thereof are achieved solely by means of dry heat. No removal of unreacted light sensitive portions by solvent treatment or the like is required. The developing conditions can be rather widely varied but normally any type of dry heat within a range of 70° C. to 300° C. for from 0.1 to 10 minutes gives effective results.

Since the products of photolysis of diazonium salts may be, for instance, phenols, aminophenols, or aromatic amines, the addition of any of these classes of compounds to diazonium salts will, in the presence of the monomer, produce polymer merely by heating and without prior irradiation with light. This fact may be used to decrease the time of heat development of light struck areas. Another consequence of this phenomenon is that a photographic reversal may be achieved in the following manner: a large amount (about 0.001% to 10% based on the weight of the monomer) of a phenol, such as phenol or cresol, for example, may be added to a relatively small amount of diazonium salt (about 0.001% to 10% based on the weight of the monomer). On irradiation the small amount of diazonium salt in the irradiated portions are destroyed completely. After heating, polymerization occurs only in the non-light struck areas while the light struck areas remain clear.

It will be appreciated from the foregoing that the spectral range of the emulsion may be controlled by the selection of the light sensitive diazonium compounds. Variations in the amount or kind of phenol, aminophenol, or aromatic amine used or variation in amount or kind of monomer used or variation in the pH of the solution effect the photographic contrast and density for a given lighting condition. As typically suitable phenols, aminophenols or aromatic amines, there may be mentioned phenol, o-cresol, m-cresol, p-cresol, aniline and p-aminophenol. Preferably, although not necessarily, the pH of the monomer solution is varied between 5.5 and 8.0.

It is believed that the present invention provides the first method for obtaining photographic images by means of polymerization initiated by the photolytic decomposition of a light sensitive diazonium salt and subsequent heating. The polymerization reaction actually occurs without heating but it takes place at such a slow rate under such conditions as to be of no significant value. On the other hand, it is not necessary that the developmental heating take place immediately after exposure. Images of excellent quality have been obtained when more than 24 hours have elapsed between the exposure and eventual heat development of the film. In every case, the final image produced is stable toward heat.

The quantum efficiency of the overall process, that is, the number of monomer molecules polymerized per quantum of light absorbed, is estimated to be greater than one million. Heretofore, the highest quantum efficiency of any photographic process using a diazonium salt as a light sensitive element has not been greater than unity.

The following examples are given by way of illustration and not limitation. In the examples, all of the percentages and proportions are given by weight.

*Example I*

An aqueous solution containing 10% gelatin, 20% calcium acrylate, 0.2% paradimethylaminobenzene diazonium chloride stabilized with zinc chloride was prepared. The solution was poured on a glass slide and dried. The slide was illuminated through a photographic negative in contact using a 500 watt tungsten lamp at a distance of 6 inches for less than 1 second. On heating the exposed film to 75° C., for 1 minute, sharp white images appeared in the light struck areas.

*Example II*

Four films were prepared, exposed and developed as in Example I except that the diazonium salt was replaced as follows: (1) p-(diethylamino) benzene diazonium chloride stabilized with sodium borofluorate, (2) p-(hydroxyethylethyl amino) benzene diazonium chloride, (3) p-(diethylamino) toluene diazonium chloride, and (4) diphenyl amine diazonium sulfate. Substantially the same results as in Example I were obtained in all instances.

*Example III*

An aqueous solution containing 15% polyvinyl alcohol, 10% acrylonitrile, 4% tris(hydroxymethyl) amino methane as a buffer, and 0.4% paradiethylaminobenzene diazonium chloride stabilized with sodium borofluoride was prepared. The solution was poured on black paper and allowed to dry.

The prepared paper was illuminated by projection in a photographic enlarger through a 35 mm. photographic negative for 3 minutes. On heating the exposed paper at 85° C., for 1 minute, a sharp enlarged image of the original 35 mm. negative was obtained where the exposed areas on the black paper now appear white (i.e. the same photographic sign).

*Example IV*

A black photographic paper similar to that described in Example III was prepared except that the concentration of the diazonium salt was reduced to one-tenth of the value and 1% para-aminophenol was added.

On exposure for 10 minutes, in the same manner as that in Example III and heating at 85° C., for 1 minute, a photographic positive enlargement of the 35 mm. negative film was obtained (i.e. of opposite photographic sign).

*Example V*

An ethanol solution containing 15% of a soluble nylon resin ("Zytel 61"), 20% methylmethacrylate, and 0.2% paradimethylaminobenzene diazonium chloride stabilized with zinc chloride was prepared.

The solution was poured on transparent cellulose acetate film and allowed to dry.

The prepared film was exposed to light through a negative film in contact with a 100 watt mercury lamp at a distance of 1 foot for less than 5 seconds. The film was then heated to 80° C., and the exposed regions appeared as white opaque images. As used in this application, photopolymerizable monomers refer to monomers which may be polymerized by a catalyst which is formed or activated by light and photopolymerization includes the process of forming or activating a catalyst by light which thereafter effects polymerization of a monomer. The term is not intended to be restricted to polymerization in which light initiates excitation of a monomer so that it polymerizes without catalysts.

It will be appreciated that various modifications may be made in the products and procedures described herein without in any way deviating from the scope of the invention as defined in the following claims wherein

We claim:

1. A photographic process which comprises exposing to a light image pattern a photographic element comprising a substantially rigid photographic composition which is a uniform dispersion of a polymerizable monomer including a single $CH_2=C<$ group as the sole site of additional polymerization and a thickening agent in a solvent for said monomer selected from the group consisting of water, alcohols, esters and ketones, said thickening agent being a colloid soluble in said solvent, and from 0.001% to 10%, based on the weight of said monomer, of a photolytic aromatic diazonium compound, whereby diazonium compound is decomposed in the areas of said composition exposed to light, and thereafter heating the composition to effect polymerization to form polymeric material in said light-exposed areas, said polymeric material being insoluble in said solvent and providing light scattering centers.

2. The process of claim 1 wherein the heating step is conducted for from 0.1 to 10 minutes at 70° C. to 300° C.

3. The process of claim 1 wherein said monomer is methyl methacrylate, said solvent is ethanol and said diazonium compound is paradimethylaminobenzene diazonium chloride stabilized with zinc chloride.

4. The process of claim 1 wherein said monomer is calcium acrylate.

5. The process of claim 1 wherein said diazonium compound is paradimethylaminobenzene diazonium chloride stabilized with zinc chloride.

6. A process for producing a photographic reversal image which comprises exposing to a light image pattern a photographic element comprising a substantially rigid photographic composition which is a uniform dispersion of a polymerizable monomer including a single $CH_2=C<$ group as the sole site of addition polymerization and a thickening agent in a solvent for said monomer selected from the group consisting of water, alcohols, esters and ketones, said thickening agent being a colloid soluble in said solvent, a relatively small amount, from 0.001% to 10% based on the weight of said monomer, of a photolytic aromatic diazonium compound and a relatively larger amount of non-volatile decomposition product of said diazonium compound, whereby diazonium compound is decomposed in the areas of said composition exposed to light, and thereafter heating the composition to effect polymerization in the areas containing undecomposed diazonium compound and said decomposition product.

7. A photographic process as set forth in claim 6 wherein the non-volatile decomposition product of said diazonium compound is a phenol.

8. A process as set forth in claim 7 in which said phenol is an amino phenol.

9. A photographic element comprising a support and a coating thereon of a substantially rigid photographic composition which is a uniform dispersion of a polymerizable monomer including a single $CH_2=C<$ group as the sole site of addition polymerization and a thickening agent in a solvent for said monomer selected from the group consisting of water, alcohols, esters and ketones, said thickening agent being a colloid soluble in said solvent, and from 0.001% to 10%, based on the weight of monomer of an aromatic photolytic diazonium compound, said solvent being a non-solvent for the polymer of said monomer.

10. A photographic element for producing a reversal image comprising a support and a substantially rigid photographic composition which is a uniform dispersion of a thickened solution of a polymerizable monomer including a single $CH_2=C<$ group as the sole site of addition polymerization and a thickening agent in a solvent for said monomer selected from the group consisting of water, alcohols, esters and ketones, said thickening agent being a colloid soluble in said solvent, a relatively small amount, from 0.001% to 10%, based on the weight of monomer, of an aromatic photolytic diazonium compound, and a relatively larger amount of non-volatile decomposition product of said diazonium compound, said solvent being a non-solvent for the polymer of said monomer.

11. A photographic element as set forth in claim 10 in which said non-volatile decomposition product of said diazonium compound is a phenol.

12. A photographic element as set forth in claim 11 in which the phenol is an amino phenol.

13. A photographic process which comprises exposing to a light image pattern a photographic element comprising a substantially rigid photographic composition which is a uniform dispersion of calcium acrylate and a thickening agent in a solvent for said monomer selected from the group consisting of water, alcohols, esters and ketones, said thickening agent being a colloid soluble in said solvent, and from 0.001% to 10%, based on the weight of said monomer, of a photolytic aromatic diazonium compound, whereby diazonium compound is decomposed in the areas of said composition exposed to light, and thereafter heating the composition to effect polymerization to form polymeric material in said light-exposed areas, said polymeric material being insoluble in said solvent and providing light scattering centers.

14. A process for producing a photographic reversal image which comprises exposing to a light image pattern a photographic element comprising a substantially rigid photographic composition which is a uniform dispersion of calcium acrylate and a thickening agent in a solvent for said monomer selected from the group consisting of water, alcohols, esters and ketones, said thickening agent being a colloid soluble in said solvent, a relatively small amount, from 0.001% to 10% based on the weight of said monomer, of a photolytic aromatic diazonium compound and a relatively larger amount of non-volatile decomposition product of said diazonium compound, whereby diazonium compound is decomposed in the areas of said composition exposed to light, and thereafter heating the composition to effect polymerization in the areas containing undecomposed diazonium compound and said decomposition product.

15. A photographic element comprising a support and a coating thereon of a substantially rigid photographic composition which is a uniform dispersion of calcium acrylate and a thickening agent in a solvent for said monomer selected from the group consisting of water, alcohols, esters and ketones, said thickening agent being a colloid soluble in said solvent, and from 0.001% to 10%, based on the weight of monomer of an aromatic photolytic diazonium compound, said solvent being a non-solvent for the polymer of said monomer.

16. A photographic element for producing a reversal image comprising a support and a substantially rigid photographic composition which is a uniform dispersion of a thickened solution of calcium acrylate and a thickening agent in a solvent for said monomer selected from the group consisting of water, alcohols, esters and ketones, said thickening agent being a colloid soluble in said solvent, a relatively small amount, from 0.001% to 10%, based on the weight of monomer, of an aromatic photolytic diazonium compound, and a relatively larger amount of non-volatile decomposition product of said diazonium compound, said solvent being a non-solvent for the polymer of said monomer.

References Cited in the file of this patent

UNITED STATES PATENTS

| Number | Name | Date |
|---|---|---|
| 2,318,352 | Alink | May 4, 1943 |
| 2,354,088 | Reichel | July 18, 1944 |
| 2,495,827 | Slifkin | Jan. 31, 1950 |
| 2,597,412 | Von Glahn et al. | May 20, 1952 |
| 2,661,331 | Howard | Dec. 1, 1953 |
| 2,679,498 | Seven et al. | May 25, 1954 |
| 2,687,958 | Neugebauer | Aug. 31, 1954 |
| 2,703,756 | Herrick et al. | Mar. 8, 1955 |
| 2,739,884 | Neugebauer et al. | Mar. 27, 1956 |
| 2,772,974 | Kosalek et al. | Dec. 4, 1956 |
| 2,791,504 | Plambeck | May 7, 1957 |